(12) United States Patent
Dove

(10) Patent No.: US 6,613,838 B1
(45) Date of Patent: Sep. 2, 2003

(54) SYNTHETIC RUBBER ELASTOMERS AS REPLACEMENTS FOR NATURAL RUBBER LATEX

(75) Inventor: Jeffrey Dove, Santa Ana, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 132 days.

(21) Appl. No.: 09/651,142

(22) Filed: Aug. 30, 2000

(51) Int. Cl.$^7$ ................................................ C08L 53/02
(52) U.S. Cl. ........................ 525/89; 525/216; 525/232; 525/236; 525/241
(58) Field of Search ................................. 525/216, 232, 525/236, 241, 89

(56) References Cited

U.S. PATENT DOCUMENTS

| | | |
|---|---|---|
| 1,026,189 A | 5/1912 | Wheeler |
| 3,078,254 A | 2/1963 | Zelinski et al. |
| 3,135,716 A | 6/1964 | Uraneck et al. |
| 3,149,182 A | 9/1964 | Porter |
| 3,231,635 A | 1/1966 | Holden et al. |
| 3,265,765 A | 8/1966 | Holden et al. |
| 3,280,084 A | 10/1966 | Zelinski et al. |
| 3,281,383 A | 10/1966 | Zelinski et al. |
| 3,322,856 A | 5/1967 | Holden et al. |
| 3,390,207 A | 6/1968 | Moss et al. |
| 3,468,972 A | 9/1969 | Hsieh |
| 3,594,452 A | 7/1971 | De La Mare et al. |
| 3,595,941 A | 7/1971 | Farrar et al. |
| 3,598,887 A | 8/1971 | Darcy et al. |
| 3,624,057 A | 11/1971 | Farrar |
| 3,632,682 A | 1/1972 | Darcy |
| 3,639,521 A | 2/1972 | Hsieh |
| 3,652,516 A | 3/1972 | Farrar |
| 3,700,633 A | 10/1972 | Wald et al. |
| 3,734,973 A | 5/1973 | Farrar |
| 3,766,301 A | 10/1973 | De La Mare et al. |
| 3,778,490 A | 12/1973 | Hsieh |
| 3,784,637 A | 1/1974 | Farrar |
| 3,949,020 A | 4/1976 | Prudence |
| 3,985,830 A | 10/1976 | Fetters et al. |
| 4,010,226 A | 3/1977 | Crossland et al. |
| 4,086,406 A | 4/1978 | Trepka |
| 4,248,981 A | 2/1981 | Milkovick et al. |
| 4,391,949 A | 7/1983 | St. Clair |
| 4,572,819 A | 2/1986 | Priddy et al. |
| 4,725,654 A | 2/1988 | Priddy et al. |
| 4,970,259 A | 11/1990 | Mitchell et al. |
| 5,055,519 A | 10/1991 | Ono et al. |
| 5,223,568 A | 6/1993 | Landi et al. |
| 5,264,488 A | 11/1993 | Takeuchi et al. |
| 5,276,100 A | 1/1994 | Coolbaugh et al. |
| 5,292,820 A | 3/1994 | Coolbaugh et al. |
| 5,360,875 A | 11/1994 | Masse et al. |
| 5,385,994 A | 1/1995 | Graves et al. |
| 5,407,715 A | 4/1995 | Buddenhagen et al. |
| 5,438,102 A | 8/1995 | Brandes et al. |
| 5,464,914 A | 11/1995 | Lo et al. |
| 5,556,383 A | 9/1996 | Wang et al. |
| 5,663,239 A | 9/1997 | Coolbaugh et al. |
| 5,786,426 A | 7/1998 | Sperling et al. |
| 5,830,182 A | 11/1998 | Wang et al. |
| 5,849,846 A | 12/1998 | Chen et al. |
| 5,951,941 A | 9/1999 | Wang et al. |
| 5,997,969 A | 12/1999 | Gardon |

FOREIGN PATENT DOCUMENTS

| | | |
|---|---|---|
| CA | 762544 | 7/1967 |
| EP | 0 214 721 | 3/1987 |
| EP | 0 335 664 | 10/1989 |
| EP | 0 379 951 A2 | 8/1990 |
| EP | 0 472 749 A1 | 3/1992 |
| EP | 0 488 021 A1 | 6/1992 |
| EP | 0 254 346 B1 | 1/1993 |
| EP | 0 523 928 A2 | 1/1993 |
| EP | 0 682 041 A1 | 11/1995 |
| EP | 0 690 075 A1 | 1/1996 |
| EP | 0 723 981 A1 | 7/1996 |
| EP | 884359 | 12/1998 |
| GB | 1025295 | 4/1966 |
| GB | 1035873 | 7/1966 |
| WO | WO 98/39044 | 9/1998 |
| WO | WO 99/13924 | 3/1999 |

OTHER PUBLICATIONS

Right Heart Catherization, Baxter Healthcare Corp., Edwards Div., 1995.

*Primary Examiner*—Jeffrey Mullis
(74) *Attorney, Agent, or Firm*—Louis Cullman; Lena Vinitskaya

(57) ABSTRACT

A nonallergenic synthetic rubber elastomer having physical qualities equal to or superior to natural rubber latex is provided. The synthetic rubber elastomer is composed of at least one high molecular weight hydrogenated tri-block thermoplastic elastomer (HTPE), at least one low molecular weight HTPE and a crosslinkable cyclic unsaturated polyolefin crystalline polymer. Articles are formed from the synthetic rubber elastomers and then exposed to crosslinking agents. The articles thus formed possess physical qualities equal to or superior to natural rubber latex and improved biocompatability.

36 Claims, No Drawings

SYNTHETIC RUBBER ELASTOMERS AS REPLACEMENTS FOR NATURAL RUBBER LATEX

FIELD OF INVENTION

This invention generally is directed to synthetic rubber elastomers, methods for their manufacture and use, and to physically and mechanically improved articles manufactured therefrom. More specifically the present invention provides new synthetic rubber elastomer compositions, articles and methods of making same which embody the desirable physical qualities normally associated with natural rubber latex in addition to markedly reduced allergenicity and significantly improved chemical and physical properties including solvent resistance, elasticity and resilience.

BACKGROUND OF THE INVENTION

Broadly stated, the present invention provides new enhanced synthetic rubber elastomers having unique combinations of physical, chemical, and mechanical properties which make them particularly well suited for replacing natural rubber latex in articles traditionally made from natural rubber latex. More specifically, the present invention is directed to functionally enhanced synthetic rubber elastomers incorporating unique cross-linkages such that the compositions function as elastomeric materials having aspects of thermoset material stability and function. These unique materials have been optimized to function as improved replacements for cured natural rubber latex while maintaining, and even surpassing the beneficial physical, chemical, and mechanical properties of natural rubber latex. Moreover, in addition to being readily applicable to the majority of existing latex article manufacturing processes, the synthetic rubber elastomer of the present invention possess the added benefit of being compatible with continuous manufacturing techniques including extrusion, blow forming, injection molding, rolling and sheet formation.

Articles manufactured from natural rubber latex exhibit a variety of desirable properties including resistance to creep (resisting the undesirable elongation of a material under constant stress), compression resistance (the ability of an article to return to its original size and volume after squeezing), elasticity, solvent and plasticizer resistance, and overall biocompatibility. Unfortunately, a primary drawback associated with natural rubber latex articles is the growing number of people that are allergic to them.

Early attempts at producing articles made from alternative non-natural rubber latex materials have been generally successful though not without their associated problems. Substitute artificial or synthetic latex materials are relatively expensive when compared to natural rubber latex and in some cases are considerably more expensive. More importantly, in most applications their physical, mechanical, and chemical properties are markedly inferior to those of natural rubber latex. For example, some artificial rubbers lack sufficient elasticity or strength to function effectively as gloves. Some are affected by solvents making them difficult to use around alcohols or naturally occurring oils which can soften and degrade the material. Others exhibit deforming material creep when subjected to constant stress. This can result in sagging and bagginess that make such materials inappropriate for inflation balloons or similar structures. Other latex replacements possess poor compression resistance and permanently deform when subjected to compressive stress. These inferior properties can make it difficult to package, store, or use articles manufactured from these alternative materials without damage.

One method for producing natural rubber latex substitutes is described in U.S. Pat. Nos. 5,112,900 and 5,407,715 both issued to Buddenhagen et al. (collectively referred to hereinafter as "the Buddenhagen patents"). The Buddenhagen patents describe a method for making elastomeric compounds composed of at least two styrene-ethylene/butylene-styrene (S-EB-S) tri-block co-polymers that are dissolved in a suitable solvent and mixed with a plasticizer such as mineral oil. The resulting emulsion is then used to form medical devices using a "dipping" technique followed by air-drying. The principal drawback, other than manufacturing costs, to Buddenhagen materials is that post manufacturing crosslinking is not possible. As a result, articles formed using the Buddenhagen technique are subject to creep and deformation.

Another method for producing natural rubber latex substitutes using hydrogenated tri-block thermoplastic elastomers (HTPEs) is discloses in U.S. Pat. No. 5,264,488 issued to Takeuchi et al. Nov. 23, 1993 (the "Takeuchi patent"). However, as in the cases with Buddenhagen, the synthetic rubber elastomers disclosed in the Takeuchi patent were not crosslinked and therefore remain subject to creep and general physical instability.

Accordingly, it is a primary objective of the present invention to provide an effective material suitable for use as a replacement for natural rubber latex in the production of commercial and medical products. Concomitant with this objective is providing elastomeric replacement materials for natural rubber latex that can be incorporated into most existing continuous manufacturing processes without significant modification or expense.

It is an additional objective of the present invention to provide alternative materials, especially for medical devices and products, enhancing their physical, chemical, and mechanical properties and thus the functionality of these devices and products.

SUMMARY OF THE INVENTION

These and other objects are achieved by the present invention which provides novel biocompatible, nonallergenic synthetic rubber elastomer, methods for producing these compounds and articles made therefrom. The novel synthetic rubber elastomers made in accordance with the teachings of the present invention provide functionally enhanced elastomers that, as compared to natural rubber latex, are less allergenic, possess increased elastomeric resilience, decreased creep, and increased resistance to oils, lipids and organic solvents while simultaneously eliminating many of the adverse properties which can significantly limit the natural product's utility.

Articles made from the synthetic rubber elastomers of the present invention possess excellent elasticity, exceptional resilience, exhibit minimal creep and resist swelling when exposed to oils, lipids and organic solvents, yet remain non-toxic. This unique combination of physical and biological properties results in a material that is ideally suited for medical devices and other products including those which may contain natural rubber latex.

The synthetic rubber elastomers of the present invention are generally made using a first component composed of at least two hydrogenated tri-block thermoplastic elastomers (the "HTPE component") and a second component containing a cyclic unsaturated polyolefin crystalline polymer (the "CPP component"), such as, but not limited to, cyclic polybutadiene, cyclic polyisoprene and cyclic polymers of 1,2 dimethylene cyclohexane. The two components are mixed and used to form a synthetic rubber elastomeric article. In another embodiment of the present invention a third component containing anti-oxidants and anti-ozonates can be added prior to forming the synthetic rubber elastomeric article. In yet another embodiment of the present invention a fourth component containing reinforcing materials can be added. Manufacturing procedures include, but are not limited to extrusion, injection molding, compression molding, calandering, and blow molding. The articles thus formed are cross-linked during a post-extrusion process in order to modify the synthetic rubber elastomer's properties.

In one embodiment of the present invention, the HTPE component is composed of at least two different HTPE polymers of the styrene-ethylene/propylene-styrene (S-EP-S) or styrene-ethylene/butylene-styrene (S-EB-S) type. Generally, HTPE polymers are selected to provide the HTPE component of the present invention with at least one low molecular weight HTPE and at least one high molecular weight HTPE.

The synthetic rubber elastomers produced in accordance with the teachings of the present invention combined the HTPE with the CPP component. The CPP component provides crosslinkable unsaturated groups to increase HTPE entanglement. The extent of entanglement present in the HTPE component is a function of the number, type and location of the double bonds within the CPP component and contributes to the synthetic rubber elastomer's character and functionality. This, in turn, is controlled by the raw materials used and reaction conditions selected utilizing the teachings of the present invention. Thus, utilizing the teachings of the present invention, the HTPE component of the present invention can be modified or designed to exhibit a wide range of physical properties.

Modification of the HTPE component is further accomplished through the addition of additional intermediate weight products or non-hydrogenated tri-block analogues. Moreover, "star" or branched analogues of the non-hydrogenated tri-block thermoplastic elastomeric polymers can be incorporated to modify chain entanglement and improve resilience. The extent of cross-linking present in the synthetic rubber elastomer of the present invention determines the final physical properties exhibited ranging from thermoplastics to thermoset resins. Consequently, precise control of the properties and functions of the materials and articles of the present invention can be achieved. This provides yet another advantageous aspect of the present invention and significantly increases the options available to materials engineers, product designers, and end users.

The synthetic rubber elastomers of the present invention so produced can then be used to manufacture articles such as balloon catheters or surgical gloves which can then be cured and cross-linked using methods such as, but not limited to, electron beam radiation, gamma radiation, or chemical vulcanization.

Further objects and advantages of the methods, compositions and articles of manufacture produced in accordance with the teachings of the present invention, as well as a better understanding thereof, will be afforded to those skilled in the art from a consideration of the following detailed explanation of exemplary embodiments thereof.

DETAILED DESCRIPTION OF EXEMPLARY EMBODIMENTS

The majority of natural rubber latex substitutes currently available are generally not suitable for many demanding applications. For example, some artificial rubbers lack sufficient elasticity or strength to function effectively as gloves, or balloons for use on catheters, or other medical use devices. While others are affected by solvents making them difficult to use around alcohols or naturally occurring oils which can soften and degrade the material. Others exhibit deforming material creep when subjected to constant stress. This can result in sagging and bagginess that make such materials inappropriate for inflation balloons or similar structures. Other latex replacements possess poor compression resistance and permanently deform when subjected to compressive stress. The present invention provides synthetic rubber elastomers that exhibit natural rubber latex elasticity, solvent resistance and resistance to creep.

In a broad aspect the synthetic rubber elastomer of the present invention are composed of at least two components. The first component is a blend of at least one low molecular weight hydrogenated tri-block thermoplastic elastomer (HTPE) and at least one high molecular weight HTPE (the "HTPE component"). Additional HTPEs can be added as required to optimize the HTPE component's physical properties, for example final polymer viscosity. A second component containing a cyclic unsaturated polyolefin crystalline polymer, such as, but not limited to a cyclic polybutadiene, cyclic polyisoprene and cyclic polymers of 1,2 dimethylene cyclohexane (the "CPP component") is added to the HTPE component. The CPP component provides unsaturated groups that permit cross-linking of the final material. In other embodiments of the present invention one or more additional components may be added. For example, in one embodiment a component containing an anti-degradant mixture is added to prolong the synthetic rubber elastomer's usable life. In another embodiment a forth component containing reinforcing material may be added to the synthetic rubber elastomeric mixture. The third and forth components may be added either separately or together depending on the final synthetic rubber elastomer qualities desired.

Generally speaking, synthetic rubber elastomers of the present invention can be considered to possess thermoplastic elastomeric properties. However, the more extensively the final composition is cross-linked, the more these synthetic rubber elastomers behave like thermoset resins. Basically, thermoplastic elastomers (TPEs), like natural rubber, soften when heated and yet retain their original properties after cooling. Synthetic TPEs include polyethylene, poly (vinyl chloride) polystyrene, etc. In the softened form these polymers may be extruded and shaped into a variety of articles; after cooling the TPEs retain the qualities exhibited by the original polymer.

Thermosetting resins (TSR) are highly cross-linked macromolecules that form rigid irregular three-dimensional structures, as in phenol-formaldehyde or urea-formaldehyde resins. These extensively cross-linked resins are essentially one large molecule and as such do not soften when heated (softening would require the breaking of covalent bonds). Products made from TSRs are generally molded prior to crosslinking while the resin is in a pliable, semi-liquid form. After crosslinking, the polymer assumes its rigid, three-dimensional properties.

There are relative advantages and disadvantages to TPEs and TSRs and a combination of their respective properties is often desired. The synthetic rubber elastomers of the present invention can be formulated to produce polymers having both TPE and TSR properties. The present invention uses HTPEs that are readily available from commercial sources to form the synthetic rubber elastomers of the present invention. The HTPEs are generally un-crosslinked in their commercial state and are therefore considered thermoplastics.

Before proceeding with a detailed description of the synthetic rubber elastomers of the present invention, a brief introduction to conventional tri-block thermoplastic elastomer chemistry will be provided. In contrast to the present invention, traditional polystyrene/polyolefin elastomeric materials having polystyrene hard domains together with polyolefin rubber domains are known in the art. These tri-block TPEs may be synthesized by first polymerizing styrene monomers with a lithium salt catalyst, preferably butyl lithium, such that a "living polymer" is created. A "living polymer" is defined as a styrene polymer, (A), wherein the lithium catalyst is not consumed by the reaction but remains bound to the beta carbon of the terminal vinyl group; thereby remaining available to react with newly added monomers.

The polyolefin rubber domain, (B), of these known materials are typically polymerized with (A) the styrene domain, such that an (AB)n diblock copolymer is formed. Typically, the polyolefin rubber domains (B) are made from either 1,3 butadiene or isoprene due to the high degree of solubility in manufacturing solvents exhibited by these compounds. The final step in the traditional tri-block TPE formation is the addition of new styrene monomer and lithium catalyst such that a second polystyrene end cap is formed polymerized with the rubber domain of the existing (AB)n polymer, hence an ABA tri-block is formed.

The prior art ABA tri-block TPE discussed above are commonly known as either SBS or SIS polymers depending upon whether butadiene (B) or isoprene (I) is copolymerized with styrene (S). These are available commercially from companies such as Shell Oil that markets their ABA tri-block TPEs under the trade name Kraton®.

While these prior art ABA tri-block TPEs have been used with limited success as rubber substitutes, relative to natural rubber latex, their susceptibility to shear stress, solvents and creep in addition to other inferior properties have made them undesirable as latex substitutes, particularly in personal or medical applications. The undesirable properties exhibited by SIS/SBS synthetic rubbers can be attributed to the unsaturated group present in the polyolefin domains that render these compounds, and articles formed therefrom, extremely sensitive to environmental factors such as, but not limited to, ultraviolet (UV) light radiation and ozone. The present inventor has addresses some of these and other drawbacks by producing articles made from SIS and SBS tri-block polymers and then cross-linking unsaturated groups in the polyolefin domains of these materials following formation and manufacturing of the articles as part of the curing step. However, it will be appreciated that while merely cross-linking SIS and SBS tri-block TPEs may result in synthetic rubber elastomers with improved resistance to creep and compression deformation, these synthetic rubbers still lack lipid and organic solvent compatibility limiting their utility to specific, solvent free applications. For a more detailed description of the ABA tri-block TPEs previously studied by the present inventor see U.S. patent application Ser. No. 09/429,221 entitled "Thermoplastic Elastomeric Material as a Replacement for Natural Rubber Latex" (the "'221 application)," the entire contents of which is herein incorporated by reference.

The novel tri-block TPEs provided in the '221 application (the "'221 TPEs") have been used to formulate significantly superior synthetic rubber elastomer substitutes than those known in the art including the those disclosed in the Buddenhagen and Takeuchi patents. Moreover, the '221 TPEs have been used to produce a variety of nonallergenic solvent resistant synthetic rubber elastomer articles possessing good elasticity. However, the '221 TPEs are not commercially available and thus require the synthesis of the TPEs themselves. While the '221 application provides methods for TPE synthesis that can be accomplished by those having ordinary skill in the polymer arts, it may be desirable to use "off-the-shelf" commercially available tri-block TPEs rather than manufacturing tri-block TPEs from raw materials for many applications. Therefore, the present invention provides methods for producing nonallergenic synthetic rubber elastomer materials that exhibit qualities similar to, or superior, to natural rubber latex using commercially available tri-block TPEs.

One method for improving a tri-block TPE's resistant to environmental factors is to hydrogenate (saturate) the double bonds in the polyolefin domain. This process results in a hydrogenated tri-block thermoplastic elastomer (HTPE).

Non-limiting examples of commercially available HTPEs suitable for use in the present invention are available from Kuraray America, Inc. (New York, N.Y.) under the trade name Septon® (Septon® is a registered trademark of Kuraray America, Inc. New York, N.Y.). The Septon® High Performance Thermoplastic Rubber Catalogue (the entire contents of which is herein incorporated by reference) contains numerous examples of individual HTPEs having a wide range of physical properties. The HTPEs used to fabricate the synthetic rubber elastomers of the present invention include either styrene-ethylene/propylene-styrene (S-EP-S) or styrene-ethylene/butylene-styrene (S-EB-S) forms and their homologues and derivatives. The styrene components of the HTPEs are rigid end blocks, or hard domains, which provide these polymers their high tensile strength. The ethylene/propylene and ethylene/butylene component are the rubber domains that provide the polymers with elasticity. The greater the proportion of styrene, the more rigid the polymer becomes on cooling, conversely, the greater the relative concentration of rubber domain, the more elastic the polymer remains. Generally, the synthetic rubber elastomers of the present invention are fabricated using HTPEs having a styrene content between approximately 10% to 25%.

The HTPE components of the present invention are prepared by selecting two or more S-EB-S and/or S-EP-S HTPEs of suitable molecular weight. Generally, at least one TPE has a relatively high molecular weight and at least one other HTPE has a relatively low molecular weight. The molecular weights range from approximately 5 to 10 kilodaltons (kDa) for the styrenic domains of both types with the rubber domains weighing between approximately 30 to 60 kDa for the low molecular weight HTPEs and 75 to 250 kDa for the high molecular weight HTPEs. The viscosities of a 10% toluene solution will be between approximately 20 to 30 centipoise (cp) for the low molecular weight HTPEs and 1000 to 1400 cp for the high molecular weight HTPEs. Suitable HTPEs are commercially available from Kuraray America, Inc. under the trade name Septon®.

The S-EB-S and S-EP-S are actually hydrogenated analogues of SIS and SBS tri-block copolymers. The hydrogenation process saturates rubber domain double bonds which reduces the HTPE's elasticity but provides them greater resistance to environmental damage caused by UV radiation, free radical oxidation and other degrading factors. However, the absence of double bounds in the rubber domains prevent post extrusion crosslinking. Consequently, materials fabricated from S-EB-S and S-EP-S tri-block polymers alone are susceptible to creep resulting in permanent deformation.

Crosslinking capacity is restored to the synthetic rubber elastomers of the present invention by adding a cyclic unsaturated polyolefin such as, but not limited to cyclic polybutadiene, cyclic polyisoprene and cyclic polymers of 1,2 dimethylene cyclohexane (CPP component) to the HTPE component prior to blending. Suitable examples of CPPs which can be used in accordance with the teachings of the present invention include, but are not limited to Vestenamer® 6213 and Vestenamer® 8012, both available from Struktol Corporation of America, Stow, Ohio (Vestenamer® is a registered trademark of Chem,sche Werke Huels Aktiengesellschaft, Gemany). Vestenamer® products are proprietary polyoctenamers containing a mixture of cis and trans geometric isomers, the 6213 version possesses a medium trans configuration content and the 8012 has a high trans configuration content. Other CPP components may be added to the HTPE component to provide crosslinking capacity to the synthetic rubber elastomers of the present invention. The addition of star or branched non-hydrogenated TPE analogues, such as but not limited to SIS and SBS, will also increase crosslinking capacity of the HTPE component of the present invention.

In other embodiments of the present invention, additional components can be added to the HTPE/CPP components to enhance the structural and chemical properties exhibited by the synthetic rubber elastomers of the present invention. For example, rubber antidegradants such as BHT may be added to reduce the damaging effects of ozone and free radical oxidation. Suitable classes of antidegradants presently known and used in the rubber industry include, but are not limited to phenolics, phosphites, thioesters, amines, quinolines and materials which combine these functional groups. The phenolic class retards oxidation by the chain breaking mechanism. This class can be divided into the subgroups of monophenols, bisphenols and thiobisphenols, polyphenols and hydroquinone derivatives. Representative of the phenolics are compounds such as 2,6-di-t-butyl-4-methylphenol, butylated hydroxytoluene, 2,2'-methylenebis(4-methyl-6-t-butylphenol), butylated reaction product of p-cresol and dicyclopentadiene, t-butylhydroquinone and the like. Representative of the phosphite class are compounds such as tris(nonylphenyl)phosphite, bis(2,4-di-t-butyl) pentaerythritol diphosphite and the like. Other antidegradant compounds that may added in accordance with the teachings of the present invention include 2,5-di-t-amylhydroquinone: N-phenyl-.alpha.-naphthylamine; p-oriented styrenated diphenylamine; octylated diphenylamines: 6-dodecyl-2,2,4-trimethyl-1,2-dihydroquinoline N-phenyl-N'-(1,3-dimethylbutyl)-p-phenylenediamine: diaryl-p-phenylenediamines; dialkyl-p-phenylenediamines; and the like. These antidegradants are known and most are commercially available.

Reinforcing fillers can be added to the present invention to improve fatigue resistance and tensile strength in the finished products. Preferred fillers possess a high surface area fumed with silica, particularly with a silane type surface treatment. This treatment would result in covalently bound polysulfide, sulfan and/or alkyl diene groups. This type of filler treatment improves compatibility and amplifies filler enhancement effects. These surface treated fillers directly cross-link to the CPE polymer backbone. The polysulfan filler has the property of providing a long-lasting polysulfidic linkage over the life of the final material. Examples of suitable silanated silica compounds useful in the practice of the present invention include, but are not limited to, silane coupled vinyl, styryl, thiol, and sulfan functional groups on fumed silica fillers such as Cab-o-sil® M-5 manufactured by Cabot Corporation, Boston, Mass.

Synthetic rubber elastomer articles made in accordance with the teachings of the present invention are generally prepared as follows. A predetermined amount of at least one high molecular weight HTPE, generally a S-EB-S tri-block copolymer, is mixed with a predetermined amount of at least one lower molecular weight HTPE, generally a S-EP-S tri-block copolymer, forming the HTPE component. Next, measured amount of a cyclic unsaturated polyolefin crystalline polymer is added to the HTPE component forming a final polymer mixture. Alternatively, a final polymer mixture made in accordance with the teachings of the present invention can be formed by mixing the high molecular weight HTPE, lower molecular weight HTPE and cyclic unsaturated polyolefin crystalline polymer together simultaneously. At this point the polymer mixture may be used to fabricate synthetic rubber elastomer article in accordance with the teaching of the present invention, or optional ingredients such as, but not limited to antidegradants, reinforcing materials or star or branched analogues of nonhydrogenated TPEs may be added.

The final polymer mixture will contain approximately 25% to 70% by weight high molecular weight HTPE(s), approximately 20% to 50% by weight low molecular weight HTPE(s) and between approximately 10% to 30% by weight cyclic unsaturated polyolefin crystalline polymer. The remainder, if any, being composed of optional ingredients. In one embodiment of the present invention the final polymer mixture contains 50% by weight high molecular weight S-EB-S (Septon® 2005), 25% by weight low molecular weight S-EP-S (Septon® 2063) and 25% by weight high trans configuration content cyclic polybutadiene (Vestenamer® 8012 containing 1% BHT).

It is understood that the present invention may contain any combination of two or more HTPEs of the present invention providing that at least one HTPE is selected from high molecular weight polymers and at least one other is a low molecular weight polymer. The exact ratio of HTPEs and the chemical composition of the HTPEs can be determined using techniques known to those of ordinary skill in the art and does not involve undue experimentation. For example, the present inventor prepared elastomeric balloons from the component mixtures listed in Table 1. The optimum elastomeric formula was selected after testing each balloon's physical performance including elasticity. Elasticity was evaluated using a variety of physical tests such as, but not limited to fatigue and tensile strength analyses. Elastomer fatigue limits were determined by inflating and deflating a balloon over a number of cycles until burst occurs. Tensile strength analysis involved inflating each balloon to catastrophic failure, or burst point. Only fatigue test results are depicted in Table 1. The composition that allowed for the maximum number of inflation/deflation cycles without bursting was considered optimum.

TABLE 1

Physical Testing of Sample Polymer Mixtures

| Formula | Percent S-EP-S[1] | Percent S-EB-S[2] | Cyclic Polybutadiene[3] | Cycles Until Burst |
|---------|-------------------|-------------------|-------------------------|--------------------|
| A | 80 | 20 | 0 | 130 |
| B | 50 | 50 | 0 | 230 |
| C | 25 | 50 | 25 | 460 |

[1]Low molecular weight HTPE
[2]High molecular weight HTPE
[3]Vestenamer ® 8012

Once the proper composition of components has been selected and blended, the mixture is then dried and formed into a desired article. The synthetic rubber elastomer articles of the present invention can be prepared using numerous manufacturing procedures known to those of ordinary skill in the art including, but not limited to extrusion, rolling, blow molding, injection molding, compression molding, calandering, or otherwise thermally processed. For the remainder of this description, article-manufacturing procedures will be referred to collectively as "extrusion" without limitation.

Following extrusion the shaped article is the crosslinked using techniques known to those in the polymer arts including, but not limited to, electron beam irradiation (E-beam), gamma irradiation and chemical processes including peroxides, bis-Malamids and vulcanization. Suitable vulcanization packages may contain, but are not limited to, sulfur, zinc oxide, steric acid, accelerators, and anti-scorch agents. Additional combinations for vulcanization packages are known in the art. Crosslinking locks the molecular structure of the extruded polymer to prevent molecular slippage and maintain elasticity. Without crosslinking the synthetic rubber elastomer articles are subject to creep, or deformation as the result or repeated use or pressure. Moreover, crosslinking provides thermoset properties to the thermoplastic thus increasing their overall durability and life expectancy. Prior art synthetic rubber elastomers like those described in the Buddenhagen patents are not chemically capable of being crosslinked and therefore do not possess desirable thermoset properties and are subject to creep and deformation.

The optimum degree of crosslinking is determined in a fashion similar to determining the optimum HTPE ratio. Polymer mixtures containing various HTPE ratios and different cyclic unsaturated polyolefin crystalline polymer concentrations were extruded and then crosslinked using various crosslinking procedures and materials. For example, the synthetic rubber elastomer having Formula C from Table 1 above was tested un-crosslinked and compared to the same synthetic rubber elastomer crosslinked using from approximately 10 kGys to approximately 40 kGys of E-beam irradiation. Both extruded samples were tested as above. The noncrosslinked material failed after 460 inflation/deflation cycles where as the synthetic rubber elastomer crosslinked using E-beam irradiation did not fail even after 500 cycles.

Without wishing to be limited, a particularly illustrative example of the unique physical, chemical, and mechanical properties of the thermoplastic elastomeric materials of the present invention is illustrated by the use of such materials as substitutes for natural rubber latex in the manufacture of thermodilution type Swan-Ganzm monitoring balloon catheters, or vascular balloon catheters. This type of balloon catheter has a geometry that requires the balloon to have at least a 1,200% working extension ratio. Additionally, the balloon material must withstand sterilization, and have an 18-month shelf life. The balloon must also survive direct blood contact for at least three days within a patient during which the balloon is repeatedly inflated approximately 100 times. Under these conditions, within a living being, the balloon must not rupture, distort, creep or become eccentric, and must survive routine insertion, maneuvering and withdrawal procedures. Balloon materials must also be non-thrombogenic, non-toxic and otherwise biocompatible for direct intravascular patient contact for a minimum of 72 hours. The synthetic rubber elastomer materials of the present invention address these difficulties by providing unique polymer combinations with enhanced physical and chemical properties required for the Swan-Ganz™ monitoring balloon catheter and for other in vivo devices. Similarly, the synthetic rubber elastomer materials and associated methods for making and using the materials of the present invention are also useful in producing improved products such as pulmonary artery monitoring balloon catheters, vascular balloon catheters, urethral catheters, gloves, bandages, tapes, blood pressure cuffs and condoms. The physical, chemical, and mechanical properties of these products can be fine-tuned and optimized for the intended working environment.

The enhanced synthetic rubber elastomeric materials of the present invention are particularly well suited to function as substitutes for natural rubber latex. As an added benefit, these latex replacement materials also maintain, and even optimize known beneficial properties such as ultraviolet and ozone resistance, fatigue resistance, tensile strength, solvent resistance, as well as plasticizer resistance. Furthermore, these synthetic rubber elastomer materials are biocompatible hemocompatible and are not susceptible to dissolution in vivo.

Those skilled in the art will further appreciate that the present invention may be embodied in other specific forms without departing from the spirit or central attributes thereof In that the foregoing description of the present invention discloses only exemplary embodiments thereof, it is to be understood that other variations are contemplated as being within the scope of the present invention. Accordingly, the present invention is not limited in the particular embodiments that have been described in detail therein. Rather, reference should be made to the appended claims as indicative of the scope and content of the present invention.

What is claimed is:

1. A synthetic rubber elastomer comprising:
at least one first hydrogenated tri-block thermoplastic elastomer component and at least one second hydrogenated tri-block thermoplastic elastomer component wherein said first hydrogenated tri-block thermoplastic elastomer component has a higher molecular weight relative to said second hydrogenated tri-block thermoplastic elastomer component, and at least one cyclic unsaturated polyolefin crystalline polymer wherein said at least one cyclic unsaturated polyolefin crystalline polymer is crosslinked.

2. The synthetic rubber elastomer of claim 1 wherein said first hydrogenated tri-block thermoplastic elastomer content is between approximately 25% to 70% by weight.

3. The synthetic rubber elastomer of claim 1 wherein said second hydrogenated tri-block thermoplastic elastomer content is between approximately 20% to 50% by weight.

4. The synthetic rubber elastomer of claim 1 wherein said at least one cyclic unsaturated polyolefin crystalline polymer content is between approximately 10% to 30% by weight.

5. The synthetic rubber elastomer of claim 1 wherein said first hydrogenated tri-block thermoplastic elastomer is a styrene-ethylene/propylene-styrene tri-block or a styrene-ethylene/butylene-styrene tri-block.

6. The synthetic rubber elastomer of claim 1 wherein said second hydrogenated tri-block thermoplastic elastomer is a styrene-ethylene/propylene-styrene tri-block or a styrene-ethylene/butylene-styrene tri-block.

7. The synthetic rubber elastomer of claim 5 wherein said first hydrogenated tri-block thermoplastic elastomer has a styrene content between approximately 10% to 25% by weight.

8. The synthetic rubber elastomer of claim 6 wherein said second hydrogenated tri-block thermoplastic elastomer has a styrene content between approximately 10% to 25% by weight.

9. The synthetic rubber elastomer of claim 1 wherein said cyclic unsaturated polyolefin crystalline polymer is selected from group consisting of cyclic polybutadiene, cyclic polyisoprene and cyclic polymers of 1,2 dimethylene cyclohexane.

10. The synthetic rubber elastomer of claim 1 further comprising an antidegradant.

11. The synthetic rubber elastomer of claim 10 wherein said antidegradant is selected from the group consisting of antioxidants and antiozaonates.

12. The synthetic rubber elastomer of claim 1 further comprising a reinforcing material.

13. The synthetic rubber elastomer of claim 12 wherein said reinforcing agent comprises a silanated silica.

14. The synthetic rubber elastomer of claim 13, wherein said silanated silica is a silane coupled fumed silica filler.

15. The synthetic rubber elastomer of claim 1, wherein said cyclic unsaturated polyolefin crystalline polymer is crosslinked using a process selected from the group consisting of electron beam irradiation, gamma radiation or chemical vulcanization.

16. An article made from the synthetic rubber elastomer of claim 1.

17. The article of claim 16 selected from the group consisting of pulmonary artery monitoring balloon catheters, vascular balloon catheters, urethral catheters, gloves, bandages, tapes, blood pressure cuffs and condoms.

18. A synthetic rubber elastomer comprising:
at least one styrene-ethylene/butylene-styrene tri-block co-polymer component and at least one styrene-ethylene/propylene-styrene tri-block co-polymer component, wherein said styrene-ethylene/butylene-styrene tri-block co-polymer component has a higher molecular weight relative to said styrene-ethylene/propylene-styrene tri-block co-polymer component, and at least one cyclic unsaturated polyolefin crystalline polymer wherein said cyclic unsaturated polyolefin crystalline polymer is crosslinked using electron-beam irradiation.

19. An article made from the synthetic rubber elastomer of claim 18.

20. A method for making a synthetic rubber elastomeric article comprising:
admixing at least one first hydrogenated tri-block thermoplastic elastomer component and at least one second hydrogenated tri-block thermoplastic elastomer component wherein said first hydrogenated tri-block thermoplastic elastomer component has a higher molecular weight relative to said second hydrogenated tri-block thermoplastic elastomer component, and at least one cyclic unsaturated polyolefin crystalline polymer to form a final polymer mixture;
forming an article from said final polymer mixture; and
crosslinking said article.

21. A method for making a synthetic rubber elastomeric article comprising:
mixing at least one first hydrogenated tri-block thermoplastic elastomer component and at least one second hydrogenated tri-block thermoplastic elastomer component wherein said first hydrogenated tri-block thermoplastic elastomer component has a higher molecular weight relative to said second hydrogenated tri-block thermoplastic elastomer component to form a hydrogenated tri-block thermoplastic elastomer mixture;
admixing at least one cyclic unsaturated polyolefin crystalline polymer into said hydrogenated tri-block thermoplastic elastomer mixture to form a final polymer mixture;
forming an article from said final polymer mixture; and
crosslinking said article.

22. The method for making a synthetic rubber elastomeric article of claim 21 wherein said first hydrogenated tri-block thermoplastic elastomer content is between approximately 25% to 70% by weight.

23. The method for making a synthetic rubber elastomeric article claim 21 wherein said second hydrogenated tri-block thermoplastic elastomer content is between approximately 20% to 50% by weight.

24. The method for making a synthetic rubber elastomeric article of claim 21 wherein said first hydrogenated tri-block thermoplastic elastomer content is between approximately 25% to 70% by weight.

25. The method for making a synthetic rubber elastomeric article of claim 21 wherein said first hydrogenated tri-block thermoplastic elastomer is a styrene-ethylene/propylene-styrene tri-block or a styrene-ethylene/butylene-styrene tri-block.

26. The method for making a synthetic rubber elastomeric article of claim 21 wherein said second hydrogenated tri-block thermoplastic elastomer is a styrene-ethylene/propylene-styrene tri-block or a styrene-ethylene/butylene-styrene tri-block.

27. The method for making a synthetic rubber elastomeric article of claim 25 wherein said first hydrogenated tri-block thermoplastic elastomer has a styrene content between approximately 10% to 20% by weight.

28. The method for making a synthetic rubber elastomeric article of claim 27 wherein said second hydrogenated tri-block thermoplastic elastomer has a styrene content between approximately 10% to 20% by weight.

29. The method for making a synthetic rubber elastomeric article of claim 26 wherein said cyclic unsaturated polyolefin crystalline polymer is selected from the group consisting of cyclic polybutadiene, cyclic polyisoprene and cyclic polymers of 1,2 dimethylene cyclohexane.

30. The method for making a synthetic rubber elastomeric article of claim 21 further comprising an antidegradant.

31. The method for making a synthetic rubber elastomeric article of claim 30 wherein said antidegradant is selected from the group consisting of antioxidants and antiozaonates.

32. The method for making a synthetic rubber elastomeric article of claim 21 further comprising a reinforcing material.

33. The method for making a synthetic rubber elastomeric article of claim 32 wherein said reinforcing agent comprises a silanated silica.

34. The method for making a synthetic rubber elastomeric article of claim 33, wherein said silanated silica is a silane coupled filmed silica filler.

35. The method for making a synthetic rubber elastomeric article of claim 21, wherein said cyclic unsaturated polyolefin crystalline polymer is crosslinked using a process selected from the group consisting of electron beam irradiation, gamma radiation or chemical vulcanization.

36. The method for making a synthetic rubber elastomeric article of claim 21, wherein said article is selected from the group consisting of pulmonary artery monitoring balloon catheters, vascular balloon catheters, urethral catheters, gloves, bandages, tapes, blood pressure cuffs and condoms.

* * * * *

UNITED STATES PATENT AND TRADEMARK OFFICE
CERTIFICATE OF CORRECTION

PATENT NO. : 6,613,838 B1  Page 1 of 1
DATED : September 2, 2003
INVENTOR(S) : Jeffrey Dove It is certified that error appears in the above-identified patent and that said Letters Patent is hereby corrected as shown below:

Column 9,
Line 47, after "thermodilution type," delete "Swan-Ganzm" and insert
-- Swan-Ganz$^{TM}$. --

Column 12,
Line 53, after "coupled," delete "filmed" and insert -- fumed. --

Signed and Sealed this

Twenty-ninth Day of June, 2004

JON W. DUDAS
*Acting Director of the United States Patent and Trademark Office*